United States Patent [19]

Gross et al.

[11] 4,118,337
[45] Oct. 3, 1978

[54] METHOD FOR REGENERATING FLUIDIZABLE SOLID PARTICLES EMPLOYED IN HYDROCARBON CONVERSION

[75] Inventors: Benjamin Gross, Cherry Hill; Klaus Wilhelm Schatz, Paulsboro, both of N.J.

[73] Assignee: Mobil Oil Corporation, New York, N.Y.

[21] Appl. No.: 807,776

[22] Filed: Jun. 20, 1977

[51] Int. Cl.² .................... B01J 29/38; B01J 21/20; C10G 11/18; C10G 11/04
[52] U.S. Cl. .................... 252/417; 208/113; 208/120; 208/155; 208/164; 252/418
[58] Field of Search ............. 252/417, 418; 208/164, 208/155, 156, 120; 23/288 B

[56] References Cited

U.S. PATENT DOCUMENTS

| 3,563,911 | 2/1971 | Pfeiffer et al. | 23/288 S |
| 3,886,060 | 5/1975 | Owen | 252/417 |
| 4,036,779 | 7/1977 | Schatz et al. | 252/417 |

*Primary Examiner*—P. E. Konopka
*Attorney, Agent, or Firm*—Charles A. Huggett; Carl D. Farnsworth

[57] ABSTRACT

A hydrocarbon conversion-catalyst regeneration operation and apparatus required is described. Hot regenerated catalyst is mixed with spent catalyst in a first upflow annular fluid catalyst bed regeneration operation about a second concentric downflow fluid catalyst bed regeneration operation. Catalyst flow-through passageways pass catalyst from said downflowing catalyst bed operation to said upflow catalyst bed regeneration operation.

10 Claims, 1 Drawing Figure

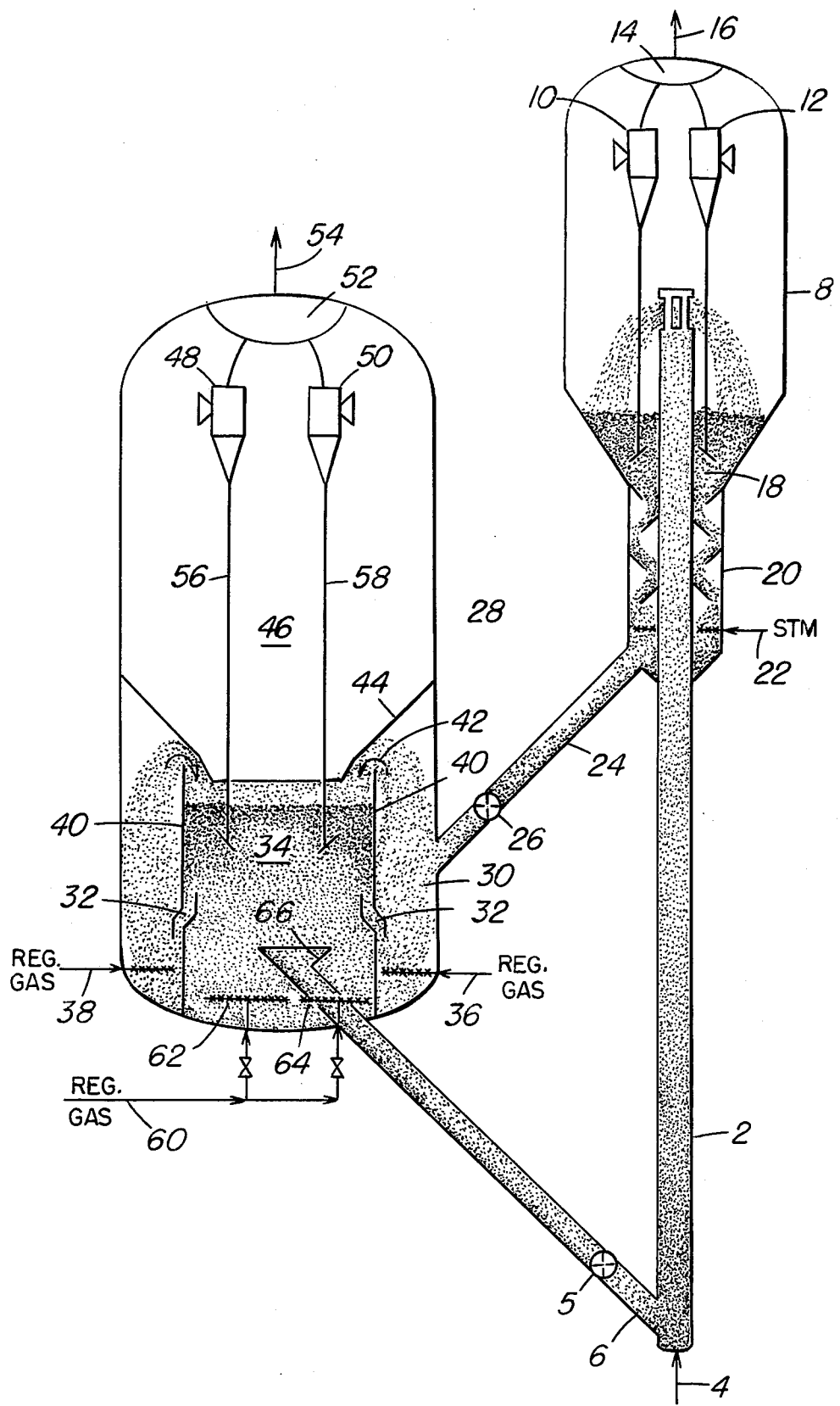

METHOD FOR REGENERATING FLUIDIZABLE SOLID PARTICLES EMPLOYED IN HYDROCARBON CONVERSION

BACKGROUND OF THE INVENTION

The technology for regenerating finely divided particles of catalyst to remove deposits of carbonaceous material obtained from a hydrocarbon conversion operation with an oxygen containing regeneration gas has been a long standing subject of investigation resulting in numerous apparatus arrangements for accomplishing such operations. Many of these apparatus arrangements are considered excessive in that they are overly large, maintain and require large catalyst inventories and are very expensive to construct. On the other hand, many of the proposed apparatus arrangements are not readily adapted to existing refinery regeneration equipment and thus become lost in the archives of technology.

The problems associated with regenerating fluidizable catalyst particles have been aggravated by the development of more active low coke producing catalyst and the desire to minimize the catalyst inventory in the processing system employed. In these regeneration operations employing high activity crystalline zeolite conversion catalysts, it is particularly important to obtain substantially complete removal of carbonaceous deposits so that the recovery of available heat is maximized. Accordingly, the present invention is concerned with an improved method, system and apparatus arrangement for removing carbonaceous deposits from fluidizable solid particles.

SUMMARY OF THE INVENTION

The present invention is concerned with an arrangement of apparatus and the method for using the apparatus to obtain regeneration of catalyst particles comprising carbonaceous material by contact with a gaseous material having an affinity for the carbonaceous material. In a more particular aspect, the present invention is concerned with a modified regeneration system more suitable for adapting to existing regeneration equipment and for regenerating high activity zeolite catalysts of relatively low coke producing characteristics in a hydrocarbon conversion operation such as a riser cracking zone.

In many of the prior art disclosures and known refinery catalyst regeneration systems, the regeneration vessel resembles a large vertical drum provided with a tangential spent catalyst inlet conduit in a lower third of the vessel and a regenerated catalyst withdrawal conduit extending downwardly from a bottom portion of the vessel. An air regeneration gas distributor grid is positioned generally horizontal in a lower bottom cross-sectional portion of the vessel and a plurality of two stage cyclone separating means with hanging diplegs are positioned in the upper portion of the vessel. The secondary stages of the cyclone separating means are connected to a plenum chamber and a withdrawal conduit for the recovery of combustion flue gases. In this vessel arrangement, a relatively dense fluid bed of catalyst comprising carbonaceous deposits is contacted with oxygen containing gas under elevated temperature coke burning conditions generally above 1000° F. but less than 1400° F. In such operations, it is relatively difficult to obtain uniform removal of coke deposits from the catalyst particles no matter the level of carbonaceous deposits on the catalyst. This type of regeneration operation is also less than desirable because of the time required to achieve desired coke burning, produces a large amount of CO normally and does not efficiently recover the potentially available heat in the operation. Also, when employing low coke producing catalysts or catalysts obtained from low coke producing chemical operations, the generated heat is less than that required in the conversion operation and more usually does not provide an efficient regeneration operation. The present invention is particularly concerned with modifications to the above briefly described catalytic conversion-regeneration systems which will effectively improve the operation and be particularly suitable for regenerating low coke producing or contaminated particles of catalyst to improve heat recovery in the operation.

The improved apparatus arrangement of the present invention and method of using comprises the addition of a smaller diameter and generally concentric cylindrical baffle member open at the top thereof extending from the bottom of the regeneration vessel upwardly to an upper intermediate portion thereof and forming an annular section between the wall of the vessel and the cylindrical baffle. Open flowthrough passageways are provided in a lower portion of the cylindrical baffle about its circumference which are designed to provide a desired limited flow of catalyst particles from a dense fluid bed of catalyst within the cylindrical baffle section into the less dense upflowing catalyst in the annular section. A downwardly sloping annular baffle member attached to the wall of the vessel is spaced vertically above and apart from the upper edge of the cylindrical baffle member to form a hood or sloping roof over said annular section. The annular baffle is wider than the annular section so that its lower edge terminates within the upper confines of the cylindrical vertical baffle above identified. A regenerated catalyst withdrawal standpipe is arranged to extend into a lower portion of said cylindrical baffle section for withdrawal of regenerated catalyst particles from above a regeneration gas distributor grid or manifold.

Means are provided for adding regeneration gas to a lower portion of each of said cylindrical section and said annular section through a plurality of horizontally spaced regeneration gas distributor means in the lower portion of each section individually controlled in various segments thereof with respect to the flow of regeneration gas therethrough. Thus, the flow of regeneration gas upwardly through said cylindrical and said annular section may be divided into a plurality of separately controlled zones comprising at least two separately controlled regeneration gas distributor grids. More usually, however, the regeneration gas distributor grids in the annular zone are arranged to provide control in the upflowing regeneration gas through at least quarter sections of the annular zone. The regeneration gas distributor means in the cylindrical section is sectionalized to permit separate gas flow control over a plurality of horizontal portions of the cylindrical cross-section. In this modified regeneration apparatus arrangement, the cyclonic separating means provided with diplegs are arranged to have the diplegs discharge into the annular as well as the cylindrical section of the vessel. All or a portion of the first stage cyclone diplegs may discharge into the annular section of the regenerator by passing through suitable seal arrangements in the annular roof thereabove. The second stage cyclone diplegs usually will all discharge into the cylindrical catalyst bed.

The arrangement of apparatus above defined and the method of catalyst flow there-through permits regenerating catalyst with relatively low levels of carbonaceous deposits under efficient high temperature regeneration conditions within the range of 1100° F. to 1400° F. In addition, the regeneration system herein described permits efficient recovery of available heat generated by promoting the combustion of carbonaceous material and formed carbon monoxide in a heat recovery atmosphere of catalyst particles. In the method and apparatus arrangement herein described, a relatively dense downflowing fluid bed of catalyst particles is maintained in the central cylindrical zone. This downflowing mass of catalyst is maintained in the presence of upflowing regeneration gas under catalyst regeneration conditions whereby the catalyst is ultimately heated to an elevated temperature of at least about 1250° F. and often to within the range of 1300° F. and 1450° F. Catalyst particles thus heated are caused to flow through the plurality of downflow catalyst passageways provided in the wall of the cylindrical baffle from the central bed of catalyst to the annular bed containing spent catalyst as a function of pressure differential there-between. In the annular catalyst bed, hot regenerated particles of catalyst discharged from the passageways are mixed with spent catalyst particles obtained from the stripping zone of a hydrocarbon conversion operation to form a mass of catalyst particles at a temperature above 900° F. and more usually above 1000° F. In some specific and preferred operations, the mixed catalyst mass thus formed will be at a sufficiently elevated temperature particularly promoting the burning of carbonaceous material as well as any formed CO. Temperatures particularly suitable for this purpose and for improving the regeneration efficiency include a mix temperature which is at least about 1175° and preferably about 1200° F. In the annular zone, the mass of catalyst particles tend to flow in a circular direction caused by the tangential inlet of spent catalyst thereto. The regeneration gas is caused to flow upwardly through the annularly moving catalyst during burning of carbon deposits and left the mass of catalyst over the cylindrical baffle upper edge for dischare into the more central baffle defined portion of the regeneration apparatus. In this operation, the upflowing catalyst in the annular zone is in an upwardly flowing dense phase condition which is less dense or more dispersed than the downflowing catalyst in the central portion of the regenerator. Under these conditions, a considerable portion of the catalyst passing from the annular zone to the upper portion of the cylindrical mass of catalyst will settle out into the fluid mass of catalyst undergoing second stage elevated temperature catalyst regeneration under downflowing catalyst conditions at an elevated temperature above 1200° F.

A relatively dispersed phase of catalyst is carried overhead and into the upper portion of the regenerator above the annular baffle or roof means. In this dispersed catalyst phase region of the regenerator, separation of the catalyst particles entrained with regeneration combustion gases is promoted by a stagnant region above the annular baffle and by provided cyclonic separating means. Thus, the catalyst settling out of entraining combustion gases in the relatively stagnant region will fall onto the annular baffle sloped to exceed the catalyst angle of repose.

The drawing is a diagrammatic illustration in elevation of an improved arrangement of apparatus for regenerating catalyst in a zone adjacent to a riser hydrocarbon conversion zone and a catalyst stripping zone.

Referring now to the drawing by way of example, a riser hydrocarbon-catalyst conversion zone 2 is charged with a gas oil or a higher boiling residual oil charge material to be cracked by conduit 4. A gasiform diluent material may be admixed with the higher boiling oil charge to assist with dispersal and contact thereof with the hot catalyst particles. Regenerated catalyst at a desired elevated temperature of at least 1200° F. or higher is charged by conduit 6 to form a catalyst-hydrocarbon suspension or mixture in the bottom portion of the riser generally at a temperature in excess of about 950° F. and more usually about 1000° F.

In the catalyst system comprising this invention, the catalyst may be any suitable fluid cracking catalyst known in the art whether amorphous or crystalline, it being preferred to employ the more recently developed crystalline zeolite cracking catalysts of selected activity and selectively characteristics. These catalysts may comprise one or more catalytic materials of large and smaller pore size crystalline materials in admixture with an amorphous matrix material which has some catalytic activity. Thus, the catalyst may comprise a faujasite crystalline zeolite as the major cracking component alone or in admixture with a smaller crystalline component such as a ZSM-5 type crystalline zeolite. By ZSM-5 type zeolite is intended to include ZSM-11, ZSM-12, ZSM-35 and ZSM-38. On the other hand, the catalyst material may be a mordenite crystalline zeolite as the major cracking component used alone or in admixture with the ZSM-5 type crystalline zeolite. These catalysts may be modified to include a CO oxidizing metal component such as platinum, chromium, copper and other known oxidizing materials.

The suspension thus formed passes through the riser section under conditions to provide a hydrocarbon residence time in the range of 4 to 15 seconds before discharge from the upper end thereof preferably directly into cyclone separating means or other catalyst separating means attached to the end of the riser and thence separately into a catalyst collecting and separating zone 8. Cyclonic separating means 10 and 12 representing a plurality of cyclonic separating means suitably connected, separate hydrocarbon vapors from entrained catalyst fines. The vapors are withdrawn to a plenum chamber 14 and withdrawal conduit 16. Catalyst separated in vessel or zone 8 is collected and passed as a mass of catalyst 18 passing downwardly through a stripping zone 20 counter-current to stripping gas such as steam introduced by conduit 22. The stripped catalyst containing residual carbonaceous deposits of the cracking operation and the stripping operation is withdrawn by standpipe 24 for passage to the regeneration operation effected in vessel 28. Valve 26 in standpipe 24 controls the flow of catalyst through the standpipe.

The stripped spent catalyst comprising carbonaceous deposits recovered from the stripping zone at a temperature of about 900° F. or higher is introduced tangentially in a specific embodiment to an annular zone 30 in the lower portion of vessel 28 for admixture with hot regenerated catalyst obtained as herein provided and passed through passageways 32 from catalyst bed 34. The amount of catalyst particles passed through catalyst downflow passageways 32 will vary depending upon the temperature of the particles. In any event, there will be enough of the hot regenerated catalyst particles to form a mix temperature with the spent catalyst in a preferred embodiment which is at least 1100° F. or 1175° F. The annular upflowing mixture of catalyst thus formed is contacted with preheated regeneration gas introduced by separate regeneration gas inlet means 36 and 38. In some prior art regenerator arrangements, the spent catalyst in standpipe 24 is introduced generally tangentially to a lower portion of a dense bed of catalyst or to an upper portion thereof. It is important that the spent catalyst be introduced a sufficient distance above the air distributor grid to minimize abrasion thereof. In the method and apparatus of this invention, the spent catalyst is introduced to the annular bed adjacent to or slightly above the regenerated catalyst flow-through passageways. The mixture of spent and freshly regenerated catalyst tends to flow around the annular zone as it moves generally upwardly there-through and thus is exposed to regeneration gas ever increasing in oxygen rich gas before discharge from an upper portion of the annular zone. The upflowing suspension in zone 30 passes over the top of cylindrical baffle 40 and through an annular passageway 42 formed with sloping annular baffle 44. The suspended catalyst thus passing over wall 40 settles out in substantial measure to form a fluid bed of catalyst particles 34. On the other hand, the combustion gases of the annular zone and the cylindrical regeneration zone entrain catalyst fines into the dispersed catalyst phase there-above and enter a plurality of cyclone separators represented by separator 48, 49 and 50 wherein catalyst fines are separated from flue gases. The separated flue gases pass into plenum chamber 52 from which they are withdrawn by conduit 54.

Baffle 44, sloped downwardly at an angle greater than the catalyst angle of repose, forms an area there-above which is sufficiently stagnant to promote hindered settling of catalyst particles carried into the dispersed phase of catalyst by the combustion flue gases. Catalyst particles separated in the dispersed phase by hindered settling pass into the dense fluid bed of particles 34. Catalyst particles separated by the cyclones and recycled by diplegs 56, 57 and 58 may be arranged to pass first stage cyclone diplegs all or in part into the annular zone or the cylindrical catalyst regeneration zone. It is generally preferred to have all cyclone diplegs discharge into the downflowing cylindrical catalyst bed.

Catalyst bed 34 is a relatively dense fluid bed of catalyst flowing generally downward and counter-current to preheated regeneration gas introduced to a lower bottom portion of the bed by conduit 60 through regeneration gas distributor grids 62 and 64. Hot regenerated catalyst particles at an elevated temperature of at least 1250° F. are withdrawn through a funnel shaped inlet 66 in open communication with conduit or standpipe 6 provided with flow control valve 5.

In the regeneration apparatus arrangement above discussed, the flow of catalyst particles through passageways 32 may be controlled by one of several different ways. For example, the head of pressure developed above the opening 32 in bed 34 may be used to control the flow of particles. On the other hand, mechanical gate means may be employed with all or a portion of the passageways in the wall or baffle 40. Also the rate of flow of the mixture of catalyst particles in zone 30 passing upwardly there-through may be relied upon to change the concentration of the catalyst particles in the upflowing suspension which in turn will effect the flow of catalyst particles down through the passageway as a function of pressure differential. It is further contemplated charging the spent catalyst to the annular zone in such a manner that a portion thereof passes around one side of baffle 40 and another portion passes around the other side of the baffle. This split flow arrangement may be accomplished by a number of different means including the use of a second standpipe extending downwardly from the stripper 20.

We claim:

1. In a fluid catalyst operation comprising conversion of hydrocarbons to lower and higher boiling products and regeneration of catalyst employed in said hydrocarbon conversion, the method for regenerating catalyst particles comprising carbonaceous material deposits which comprises passing spent catalyst into an annular catalyst regeneration zone about the periphery of an inner concentric catalyst regeneration zone, admixing hot freshly regenerated catalyst particles obtained from said concentric zone with said spent catalyst in said annular zone in an amount sufficient to raise the temperature of said spent catalyst to a temperature promoting the combustion of carbonaceous material in the presence of oxygen containing regeneration gas, causing said mixture of spent and regenerated catalyst to flow as a suspension in combustion supporting gases generally upwardly through vertical sections of said annular zone during combustion of carbonaceous material with controlled amounts of introduced combustion supporting gas, discharging the suspension from the top of said annular zone through an annular passageway into a dispersed phase of catalyst above said concentric catalyst regeneration zone for flow generally downwardly therethrough as a dense flowing bed of catalyst and countercurrent to rising regeneration gas, introducing combustion supporting regeneration gas to a bottom portion of said concentric downwardly flowing bed of catalyst beneath the inlet of a regeneration catalyst withdrawal zone, passing regenerated catalyst from a lower portion of said concentric bed through said withdrawal zone to a hydrocarbon conversion zone, separating particles of catalyst from combustion gases in said dispersed phase above said concentric bed of catalyst, withdrawing said combustion gases and passing catalyst separated in said dispersed phase into said concentric bed.

2. The method of claim 1 wherein catalyst is separated from combustion flue gases in said dispersed phase in a cyclone separating zone and catalyst thus separated is returned to said concentric bed of catalyst.

3. The method of claim 1 wherein catalyst separated from combustion flue gases in said dispersed phase is passed in part to said annular zone.

4. The method of claim 1 wherein catalyst particles are passed from a lower portion of said concentric catalyst bed to said annular zone through downflowing catalyst passageways there-between for admixture with spent catalyst particles introduced to said annular zone.

5. The method of claim 1 wherein the mixture of spent catalyst particles and regenerated catalyst particles in the annular zone is at least 1100° F.

6. The method of claim 1 wherein the spent catalyst is introduced tangentially to said annular zone.

7. The method of claim 1 wherein regeneration of the catalyst is accomplished under conditions promoting the combustion of CO.

8. The method of claim 1 wherein catalyst separated from combustion flue gases in the dispersed phase is passed directly to said annular zone in substantial measure.

9. The method of claim 1 wherein combustion flue gas with entrained catalyst particles pass from said annular zone into a dispersed phase of catalyst above said concentric downwardly flowing bed of catalyst.

10. The method of claim 1 wherein substantially all of said catalyst particles passing upwardly through said annular zone pass into said concentric bed of catalyst.

* * * * *